United States Patent [19]

Carleson

[11] 4,225,821
[45] Sep. 30, 1980

[54] ELECTRONIC SIGNALLING DEVICE TO ALERT CB RADIO EQUIPPED VEHICLES

[76] Inventor: Donald V. Carleson, 346 Sylvan Ave., San Mateo, Calif. 94403

[21] Appl. No.: 855,166

[22] Filed: Nov. 28, 1977

[51] Int. Cl.² .............................................. H01B 1/38
[52] U.S. Cl. ..................................................... 455/73
[58] Field of Search ........................ 325/15, 28, 20, 21, 325/25, 64, 55, 111; 340/32, 33, 34

[56] References Cited

U.S. PATENT DOCUMENTS

| | | | |
|---|---|---|---|
| 3,138,755 | 6/1964 | Kompelien | 325/18 |
| 3,345,569 | 10/1967 | Casterline | 325/15 |
| 3,482,164 | 12/1969 | Lawson | 325/21 |
| 3,613,003 | 10/1971 | Kubo | 325/64 |
| 3,796,958 | 3/1974 | Johnston | 325/111 |
| 3,818,345 | 6/1974 | Miya | 325/64 |
| 3,873,963 | 3/1975 | Neal | 340/34 |
| 3,921,074 | 11/1975 | Baird | 340/32 |
| 4,013,994 | 3/1977 | Ragano | 325/64 |

Primary Examiner—Robert L. Richardson
Assistant Examiner—Michael A. Masinick

[57] ABSTRACT

An electronic signalling device is disclosed whereby Citizens Band Radio equipped vehicles are provided with an independent signalling system whereby one vehicle may gain the attention of and alert a second vehicle equipped with the same system, in close proximity, preferably in visual contact, for the express purpose of requesting voice communication on their respective CB radios. The signalling system utilizes a tone signal device and electromagnetic radiant device to designate the CB Radio channel number requested for subsequent communication.

4 Claims, 5 Drawing Figures

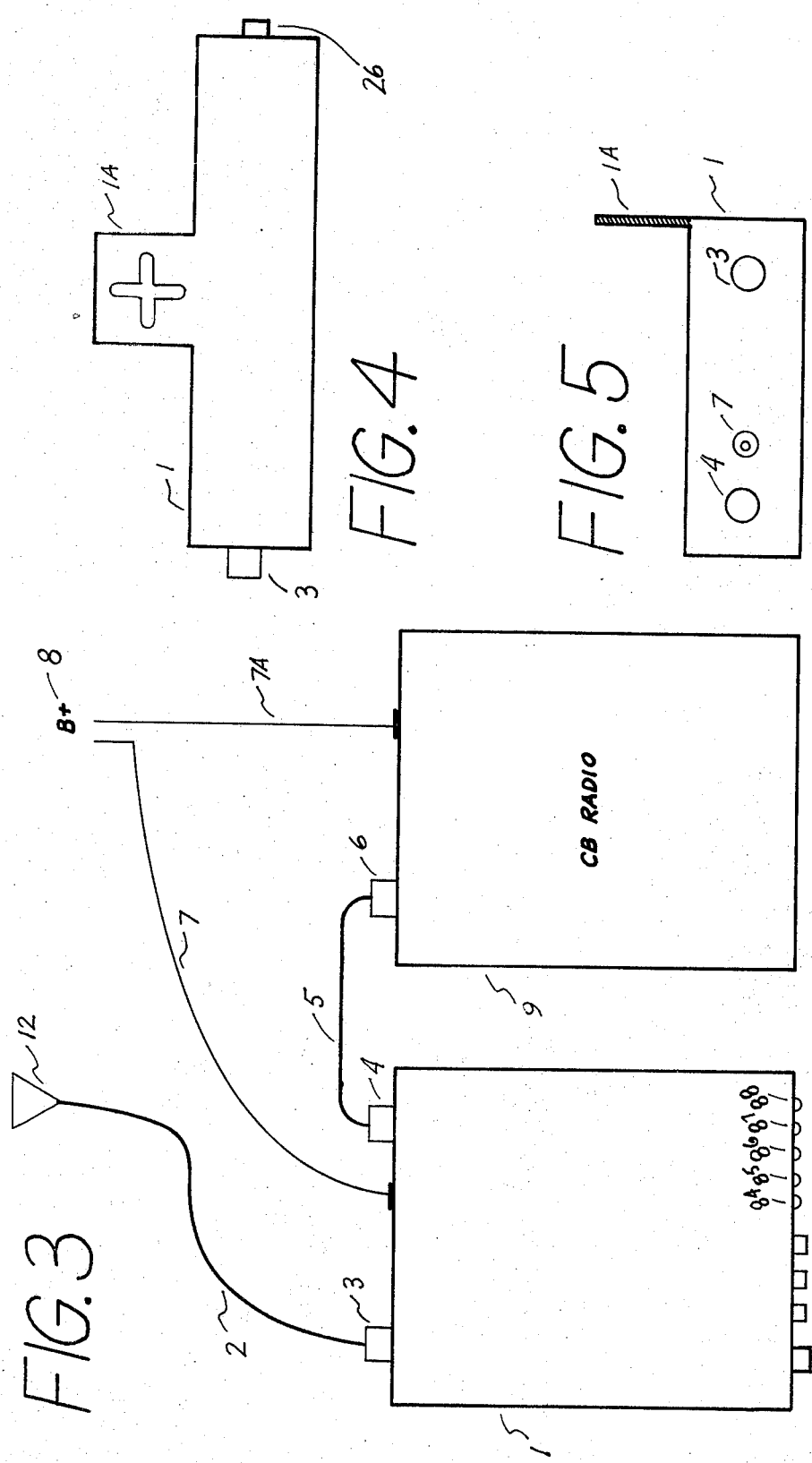

ELECTRONIC SIGNALLING DEVICE TO ALERT CB RADIO EQUIPPED VEHICLES

BACKGROUND OF THE INVENTION

The present invention relates generally to vehicle communication and more specifically to an electronic alerting system whereby one vehicle may gain the attention of another vehicle, in close proximity, preferably in visual contact. Both vehicles being equipped with CB radios and CB antennas, which are used in concert with said invention.

There now exist vehicle emergency warning devices which are limited to warning vehicles of impending danger and road hazards. These warning systems provide tranceiver apparatus comprising a tone and flashing light which are used as alarm signals in the event of impending danger. These devices are indiscriminate in their operation and are used merely to radiate an audio and visual alarm to all vehicles within range.

The present invention however is designed to provide CB radio equipped vehicles with an independent means whereby in combination with the existing CB antenna said vehicles may transmit and receive a tone signal and radiant signal with said device. Thus, one vehicle can gain the attention of and alert a second vehicle for the express purpose of indicating a request for voice communication on their respective CB radios. The number of single frequency tone signals and resultant radiant signals transmitted and received designates the CB radio channel number being requested for subsequent CB radio voice communication.

Heretofore it has been impossible for one CB radio equipped vehicle to contact a second CB radio equipped vehicle when said second vehicle's CB radio power is off, or it is not known what CB channel said second vehicle is monitoring.

This invention overcomes these difficulties by providing each vehicle with a specially designed, crystal controlled, single RF radio frequency, tone signal generating and electromagnetic radiant radiating transceiver.

OBJECTIVES OF THE INVENTION

Accordingly, an object of the invention is to provide switch means and coupling means whereby said transceiver will operate independently of, but in conjunction with the existing CB radio system in each vehicle.

Another object of the invention is to provide circuitry means whereby said invention may operate in combination with the existing CB antenna in each vehicle.

Another object of the invention is to provide RF radio frequency protection circuit means between said transceiver and the CB radio, and from strong RF carriers present at the CB antenna.

Another object of the invention is to provide a single RF carrier signal which is acceptable to present FCC regulations.

Another object of the invention is to provide a narrow band RF carrier which through modulation will obviate all external RF interference within said transceiver, especially those frequencies within the Citizens Band.

Another object of the invention is to provide switch means whereby the operator may transmit any number of the same RF signal which designates the CB radio channel number to the receiving vehicle for subsequent CB radio voice communication.

Another object of the invention is to provide circuit means whereby said RF carrier signal is modulated, converted to a digital signal and then measured by timer means to indicate a signal of sufficient time length to be a valid signal.

Another object of the invention is to then decode said carrier signal, count each signal, and display each count by electromagnetic radiant means provided.

Another object of the invention is to provide switch means whereby the radiant means which are illuminated may be reset to a standby mode ready for the next transmission.

Another object of the invention is to provide circuit means whereby said invention, while in transmit mode, may sample the RF signal energized for transmission and produce an audio-visual feedback within said transmitting device as a means of self-check of the operation.

Another object of the invention is to provide circuit means to give a slight delay to the radiant means energized within the transmitting unit so the operator can verify a tone signal of sufficient length has been transmitted.

Another object of the invention is to provide output RF carrier capacity means whereby operator may control the range of the transmission to variable distances.

Another object of the invention is to provide adjustable mounting bracket means whereby said transceiver may be incorporated within the mounting arrangement of the existing CB radio system installation of each vehicle.

OPERATION OF THE INVENTION

Briefly, the invention operates in the following manner. First said transceiver, mounted in a CB radio equipped vehicle, is actuated by momentary switch means into the transmit mode. The RF carrier signal is thus energized and transmitted through the CB antenna. Said signal being then received by a second said transceiver mounted in another CB radio equipped vehicle through its CB antenna. The receiving device demodulates and amplifies the signal, decodes and counts the accepted signal, which is then displayed by radiant means and generates an audio tone through its speaker. The transmitting device, at the same time, is generating an audio tone and illuminating its like radiant means as a self-check of correct transmission and function. This operation is primarily used between two vehicles in close proximity, preferably in visual contact.

In way of illustration; one such embodiment of this invention would comprise a push-button momentary switch to actuate the RF carrier signal and a row of singular radiant display means. Each time said switch is depressed, one audio tone is generated and one radiant is illuminated.

Example: The operator of one vehicle equipped with the invention, in a mobile or stationary situation sees and wishes to alert and gain the attention of a second vehicle also equipped with the invention. The identity of same being verified by decals, bumper stickers or other graphic symbols which appear on second vehicle.

First vehicle operator adjusts range control to the distance of the second vehicle and depresses said transceiver push-button switch three times. Second vehicle operator hears three tone signals and sees three radiants illuminated on his transceiver. Second vehicle operator has thus been alerted to a request to communicate on channel three on his CB radio. Second vehicle operator may then turn on his CB radio to channel three, or if he is already monitoring, switch to channel three and begin voice communication with first vehicle operator. While the first vehicle operator is transmitting the alert signal, he also hears three tone signals and sees three illuminated radiants on his transceiver which verifies transmission.

The radiant means described above serves two purposes. If the receiving vehicle operator is unsure of the number of tone signals received, a visual check of the number of radiants illuminated will substantiate the channel request. Radiant indication also negates all internal and external noise competition with the tone signal transmission.

When the alert transmission has been completed, both said operators, by actuating reset switch means, may return their respective radiant means to a de-energized, stand-by mode, ready for the next alert transmission.

This invention will eliminate the problem of random, multiple reception by providing range control circuit means whereby only the vehicle visually selected will receive the transmission. Said range control will adjust the carrier capacity output to the distance of said vehicle which prevents the signal being received by vehicles beyond the selected vehicle. However, if, inadvertently, more than one vehicle receives alert tone signals, the problem is eliminated by a verbal description of the selected vehicle being given by the transmit operator when beginning CB radio communication.

Said range control means may be used in cases of extreme emergency by adjusting to maximum range, beyond visual contact, then actuating a continuous unbroken tone signal whereby all vehicles within range are alerted to communicate with the transmit vehicle on CB react emergency channel nine.

This invention will reduce cost, simplify installation and operate at maximum efficiency by utilizing the existing CB antenna already present in the vehicles, for transmit/receive operation. Whereby coupling and circuit means in said transceiver will easily facilitate connection with existing CB radio and antenna system. Said coupling and circuit means being an integral part of this invention. However, an alternate embodiment could incorporate a separate antenna with said alert transceiver.

This invention provides a power supply on-off switching means for use during extended periods of vehicle storage.

Energizing power for said alert transceiver is derived from electric current means provided by vehicle power source. An alternate embodiment could employ a power supply within the invention.

To facilitate installation of this invention with existing CB radios the alert transceiver includes a specially designed adjustable mounting bracket which is used in conjunction with the existing CB radio mounting bracket and screws.

Other objectives and advantages of this invention will become understood hereinafter from a careful consideration of the following description with reference to the accompanying drawings forming a part thereof, and in which like numerals correspond to like parts throughout the various views of the invention.

THE DRAWINGS

FIG. 1 is a block diagram of a CB radio signalling system constructed in accordance with the inventive priciples;

FIG. 2 is a schematic diagram of electronic circuitry suitable for use in the system of FIG. 1;

FIG. 3 is an external top view of the preferred embodiment of couplings for use in the system of FIG. 1;

FIG. 4 is a side view of housing showing adjustable bracket on the preferred embodiment; and FIG. 5 is a rear view of FIG. 4.

DESCRIPTION OF THE DRAWINGS

FIG. 1 therefore, shows switch section 26A coupling the antenna 12 to the RF protective section 16 by means of the normally closed contacts in the receive mode thereof while the normally open contacts in the transmit mode are coupled to the RF amplifier section 10. Switch section 26B couples a CB radio 9 to switch section 26A and the antenna 12 in the steady state and to ground in the momentary state. Switch section 26C couples the B+ power supply 8 from normally closed switch 103 to the RF protection section 16 in its steady state and to the audio tone generator section 21 and the transmit modulator section 13 in its momentary state. Switch section 26D couples the adjustable threshold detector section 18 to the output of the audio tone generator section 21 in its momentary state.

Figure 1:
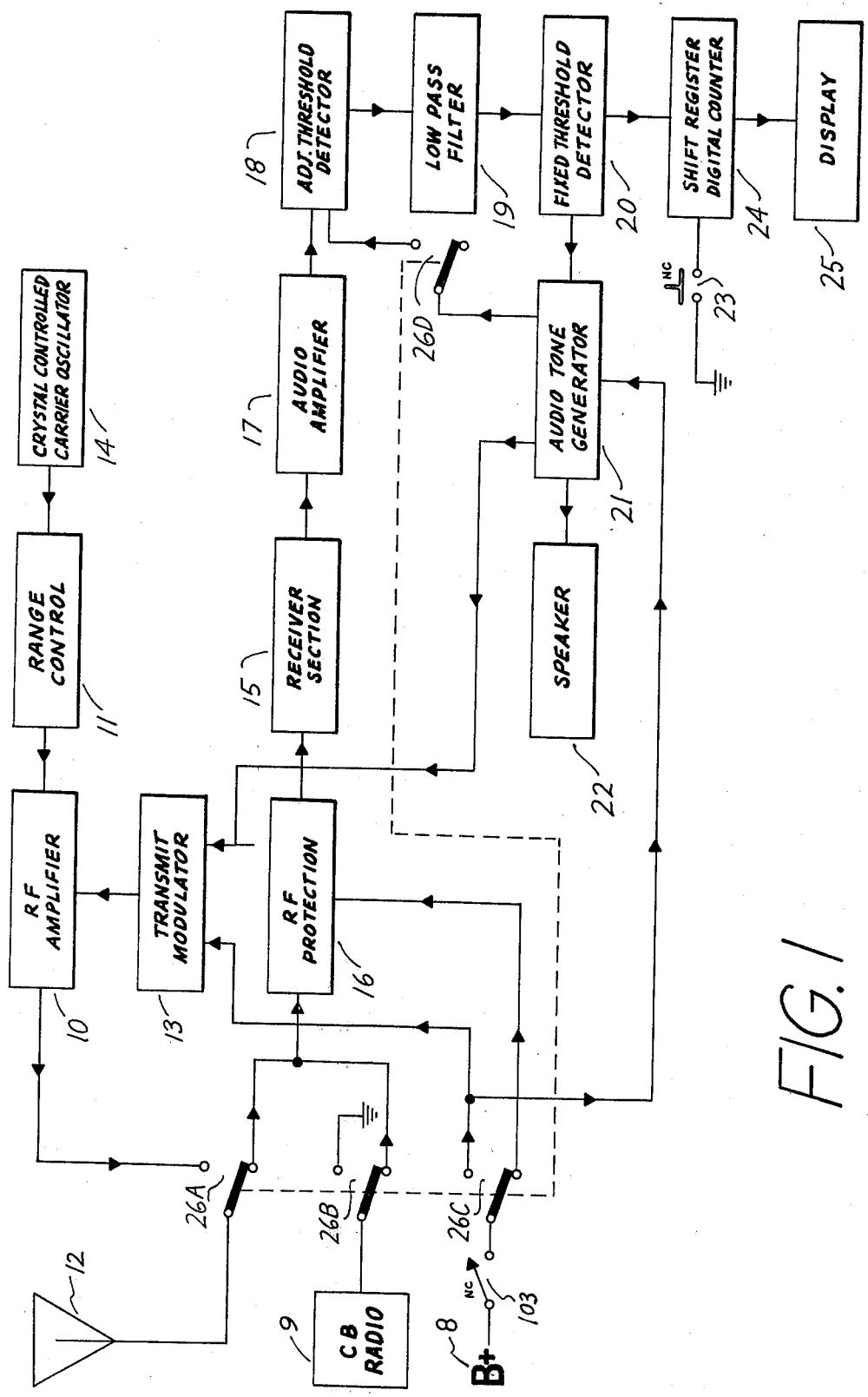
FIG. 1 is a block diagram of the invention and system. The existing CB antenna 12 is coupled to the system by means of a switch section 26A which is one switching element of a multi-ganged two position momentary actuated switch 26. The switch 26 is adapted to have a first or steady operating state and a second or momentary operating state. Steady state being the receive mode, and momentary state being the transmit mode. The switch 26 will be illustrated in its first or steady state position.

The RF protection section 16 is coupled to the receiver section 15 which is coupled to the audio amplifier section 17. The audio amplifier 17 is coupled to the adjustable threshold detector section 18, which is coupled to the low pass filter section 19, which is coupled to a fixed threshold detector section 20. The fixed threshold detector 20 is coupled to the shift register digital counter section 24 and the audio tone generator 21. The shift register counter 24 serially activates the radiant display section 25. The digital counter 24 has a reset function provided by switch 23. Switch 23 is a two position momentary actuated single section device. Switch 23 is grounded in its normally closed first or steady state and uncouples from ground in its second or momentary state. The audio tone generator 21 is activated by the fixed threshold detector 20 in the receive mode and by switch section 26C in the transmit mode. The output of the audio tone generator 21 is coupled to speaker 22. The output of the audio tone generator 21 also couples to the transmit modulator 13 which provides tone modulation for the RF amplifier section 10. Carrier frequency to the RF amplifier 10 is provided by the crystal controlled carrier oscillator section 14. Carrier output capacity is controlled by the range control section 11.

OPERATION

The invention operates in the following manner. A signal from a like device is received by means of the antenna 12 then accepted by the RF protection 16. The accepted signal is then demodulated by the mixer-local oscillator, intermediate frequency amplifier and detector all of which comprise the receiver section 15. The audio frequency is then amplified by the audio amplifier 17 and is converted to a digital signal by the adjustable threshold detector 18 then filtered by a low pass filter 19 to provide a time constant to detect a signal of sufficient time length to be a valid signal. The signal is then passed through a fixed threshold detector 20, which then passes the digital signal to the shift register digital counter 24 to indicate a signal to be counted and displayed. A signal of proper length per unit time will provide a valid digital pulse at the counter 24. Digital counter 24 will display a single count per signal received serially on the radiant display 25. An audio tone indication is also presented with a valid signal, through the speaker 22 by means of the audio tone generator 21 which is activated by the fixed threshold detector 20.

To provide protection to the device from RF transmitted by the CB radio 9, which is coupled to the same antenna 12, or a strong RF signal which is present at the antenna 12, the RF protection circuit 16 uncouples the receiver section 15. The receiver B+ power supply 8 is also uncoupled by means of the RF protective circuit 16.

When switch 26 is depressed to the second or momentary state, the device enters the transmit mode whereby a carrier is produced at the crystal controlled carrier oscillator 14. The carrier output capacity is controlled by the range control section 11 then it is amplified by the RF amplifier 10 and modulated from the audio tone generator 21 through the transmit modulator 13. Switch section 26D, then in the momentary state, lets the adjustable threshold detector 18 sample the audio output of the audio tone generator 21 and provide an audio and radiant feedback as in the receive mode. The time constant provided by the low pass filter 19 gives a slight delay to the radiant means at display 25 so the operator may verify that a tone of sufficient length has been transmitted.

Figure 2:
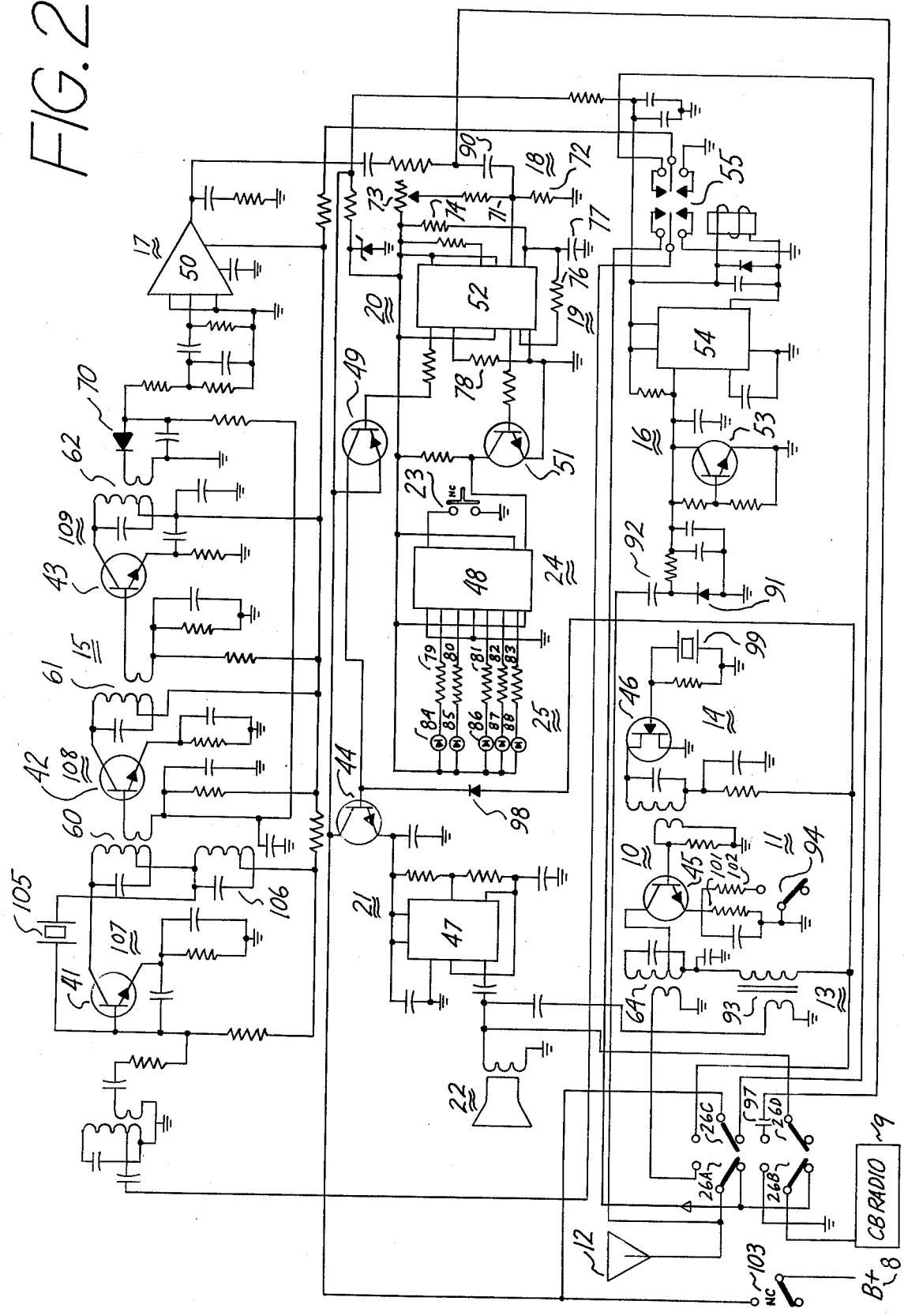

FIG. 2 is a schematic diagram of the electronic circuitry of the invention following the inventive principles as set forth in FIG. 1 wherein, the CB antenna 12 is coupled to the CB transceiver 9 through switch sections 26A and 26B which in their first or steady state condition as shown, provide RF signal reception to the CB transceiver 9 as well as providing a 27.045 MHz receiving RF signal which is accepted through relay 55 in the RF protection circuit 16 (FIG. 1) then is coupled to the receiver section 15 (FIG. 1). Said signal from the antenna 12 passes through switch 26A and said relay 55 to a mixer-crystal controlled local oscillator circuit 107, which includes transistor 41, the 16.345 MHz crystal 105 and the coil 106. Said mixer-local oscillator circuit 107 produces an intermediate frequency signal which is coupled to the first IF amplifier 108, which includes transistor 42, by means of 10.7 MHz transformer 60. The signal is further amplified by the second IF amplifier 109, including transistor 43 which is coupled to the first stage by 10.7 MHz transformer 61. The IF signal is then coupled by 10.7 MHz transformer 622 to a diode 70, which acts as a detector to provide an audio frequency output. The mixer-crystal controlled local oscillator 107, IF amplifiers 108, 109 and the detector diode 70 comprise the receiver section 15 (FIG.1)

The 27.045 MHz RF signal described and its subsequent acceptance through 16.345 MHz crystal 106 and 10.7 MHz transformers 60,61 and 62 are cited merely by way of example, and it is understood, other frequencies may be employed. Transmit frequency 27.045 MHz is also only one of many FCC approved frequencies which may be used with this invention. Since the invention must be operated in conjunction with citizen band frequencies and other circumjacent RF signals, the crystal 106 and transformer 60,61,62 frequencies described, are only one of many ways the receive capabilities of this invention will obviate all external RF signal interference with said transceiver.

To continue, the audio frequency output of the receiver 15 (FIG. 1) is then coupled to the audio amplifier section 17. Integrated circuit 50 and its components represent the audio amplifier section 17 (FIG. 1).

The output from the audio amplifier 17 is coupled by capacitor 90 to the adjustable threshold detector 18, the low pass filter 19, and the fixed threshold detector 20 circuitry sections of (FIG. 1). The threshold detector circuits 18 and 20 are included in integrated circuit 52 which is made up of two digital timer circuits in one dual inline package (DIP). The two timers are used independently. The first timer circuit includes two voltage comparators which are internally adjusted to $\frac{1}{3}$ and $\frac{2}{3}$ of the supply voltage Vcc. The output of each comparator drives an R-S flip flop. The input resistors 71, and 72 and the sensitivity control 73 bias the input at a point just above the threshold value of $\frac{1}{3}$ Vcc. When the audio frequency signal drives the input below the $\frac{1}{3}$ Vcc point, the output goes high, logic 1. A pull-up resistor 74 is used on the output to assure a logic 1 close to the Vcc voltage. The control 73 is used to control the sensitivity. The first timing circuit used, including half of integrated circuit 52, resistors 71, 72, 74 and sensitivity control 73 comprise the adjustable threshold detector section 18 (FIG. 1).

The output of the adjustable threshold detector 18 is coupled to the low pass filter circuit 19, which includes resistor 76 and capacitor 77, which in combination provide an RC time constant which is used to average the voltage applied to it by the output of the adjustable threshold detector 18. With the output of the adjustable threshold detector 18, the capacitor 77 charges to a final value of approximately fifty percent of the Vcc. The output of the low pass filter 19 is coupled to the input of the second timer circuit in the integrated circuit 52. The internal circuits of the timer section are identical to those of the first timer, however, the second timer will be used in a fixed threshold mode rather than being adjustable like the first timer. With resistor 78 the voltage comparators in the timer are now set to a value 1/6 and $\frac{1}{3}$ of the Vcc. In this mode the threshold of the timer is such that two threshold levels are present, one in a logic 0 state and the other in the logic 1 state. The comparators are still set so the inputs are $\frac{1}{3}$ and $\frac{2}{3}$ of the output of the low pass filter 19. When capacitor 77 is charging, the output of the second timer does not go to a logic 1 until the input exceeds $\frac{2}{3}$ of the low pass output voltage. But once at logic 1, the output does not return to a logic 0 until the low pass output voltage drops below $\frac{1}{3}$ of its full output. The second timer, the second half of the integrated circuit 52, is the fixed threshold detector section 20 (FIG. 1).

The output of the fixed threshold detector 20, which is the output of the second timer, is inverted by transistor 51 which couples the signal to a 5-bit shift register digital counter section 24 (FIG. 1). The integrated circuit 48 comprises counter section 24.

The outputs of integrated circuit 48 are coupled through current limiting resistors 78, 80, 81, 82 and 83 to a series of electromagnetic radiant means 84, 85, 86, 87 and 88. The radiant means are activated serially by integrated circuit 48, thus indicating the number of signals counted by integrated circuit 48. The radiant means 84, 85, 86, 87 and 88 and resistors 79, 80, 81, 82 and 83 comprise the display section 25 (FIG. 1).

The radiant display means described and shown herein are merely the preferred embodiment and may incorporate alternate radiant display means well known to those skilled in the art.

Another output which is available at integrated circuit 52 is an open collector output. The output is coupled to transistor 49 which provides a supply voltage to transistor 44 which acts as a bipolar transistor switch to energize the integrated circuit 47. The integrated circuit 47, transistors 44 and 49 and their components comprise the audio tone generator section 21 (FIG. 1).

The audio tone generator 21 is energized through transistors 44, 49 and the open collector output of integrated circuit 52, when the output of the second timer in integrated circuit 52 is in logic 1 state. This gives an audio signal through speaker 22 (FIG. 1), when a signal is present at the receiver 15 and is detected and filtered by the integrated circuit 52. A digital pulse is also sent to transistor 51 to be inverted so the integrated circuit 48 can indicate a signal has been received and should be counted. This gives a single count indication on the display 25 and also energizes the audio tone generator 21 to give an audio response.

To protect the receiver section 15 of this device, a RF protection circuit 16 has been provided for use when the CB radio 9 is placed in the transmit mode or a strong RF signal is present at the antenna 12. Since the antenna 12 is coupled to the receiver section 15 of this device as well as the CB radio 9, a means to uncouple the antenna 12 from the receiver section 15 must be employed. The antenna 12 is coupled to a diode 91 by the capacitor 92. The diode 91 rectifies the RF signal to provide a DC voltage for transistor 53 which is set to start the relay timing cycle of integrated circuit 54 when it is saturated. When transistor 53 becomes saturated and the integrated circuit 54 is activated, relay 55 is energized which uncouples antenna 12 through switch section 26A from the receiver section 15. Relay 55 also uncouples the B+ power supply from switch section 26C and the receiver section 15. The integrated circuit 54 provides a timing delay for relay 55. Capacitor 92, diode 91, transistor 53, integrated circuit 54 and relay 55 comprise the RF protection section 16 (FIG. 1).

When switch 26 is depressed to the second or momentary state, the device enters the transmit mode and performs in the following way. Switch section 26A uncouples the antenna 12 from the receiver section 15 and couples it to the RF amplifier section 10 (FIG. 1) by means of transformer 64. Switch section 26B uncouples and grounds CB radio 9. Switch section 26C uncouples the B+ power supply 8 from the receiver section 15 and couples it to the transmit modulator section 13 (FIG. 1) and the audio tone generator section 21 (FIG. 1). Switch section 26D couples audio tone generator 21 from integrated circuit 47 through capacitor 97 to capacitor 90 and the adjustable threshold detector 18.

The transmit output is coupled to switch section 26A which is coupled to antenna 12 through transformer 64. Transistor 45 is the RF amplifier which couples its output to transformer 64 which is modulated by transformer 93 which comprises the transmit modulator section 13 (FIG. 1). When switch section 26C enters the momentary state, B+ power supply is applied to one secondary winding of transformer 93, and at the same time the integrated circuit 47 is energized through diode 98 and transistor 44. Since the output of the audio tone generator 21 is coupled to the primary winding of transformer 93, a tone modulated output occurs at transformer 64. The RF carrier frequency is supplied by 27.045 MHz crystal 99 and transistor 46 which couples the RF signal through transformer 63. Crystal 99, transistor 46 and transformer 63 comprise the crystal controlled carrier oscillator section 14 (FIG. 1).

The RF output carrier strength is controlled by resistors 101,102, which select the output capacity of transistor 45 by means of switch 94. The output capacity of transistor 45 gives the transmit section its range capabilities. Resistors 101, 102 and switch 94 comprise the range control section 11 (FIG. 1). Transistor 45 and transformer 64 comprise the RF amplifier section 10 (FIG. 1).

The B+ power supply 8 is controlled by switch 103 which allows the device to be turned off by the operator.

FIG. 3 depicts a top view of the invention in simplified form to show the coupling and connecting means whereby said invention is incorporated within the existing CB system. Said signalling transceiver housing 1 is coupled to the existing CB antenna coaxial cable 2 from the existing CB antenna 12 by means of coupling connector 3. The coupling connector 4 couples the new antenna coaxial cable 5 to the existing coupling connector 6 on the existing CB radio 9. The power supply cable 7 from the housing 1 is coupled to B+ power supply 8, bypassing power supply cable 7A already coupled to CB radio 9. This preferred embodiment of the system as described in FIG. 1 shows the position of switching and radiant means whereas from left to right, actuating switch 26, range control switch 94, power on-off switch 103, radiant means reset switch 23 and a row of five radiants 84 through 88. Alternate arrangement of the elements comprising FIG. 3 are possible and FIG. 3 is presented merely as an example of the device in practice.

FIG. 4 is a side view of housing 1 to show position and configuration of adjustable mounting bracket 1A which is a side part of the housing 1. Switch 26 is shown at the front of housing 1 and connector 3 at the rear.

FIG. 5 is a rear view of FIG. 4. The adjustable mounting bracket 1A positioned on the side of the housing 1, and antenna connectors 3 and 4, and power supply connector 7.

The present disclosure of the invention includes that contained in the appended claims, as well as that of the foregoing description. Although this invention has been described in its preferred form with a certain degree of particularity, it's understood that the present disclosure of the preferred form and embodiment has been made only by way of example and that numerous changes in the details of the circuit and the arrangement of circuit elements including system components may be resorted to without departing from the spirit and scope of the invention as hereinafter claimed.

I claim:

1. A signalling transceiver for use by an operator of a CB transceiver equipped vehicle to alert the operator of a similarly equipped vehicle, said signalling transceiver being normally in a receive mode and having a momentary transmit mode, comprising in combination;
  means for connecting the signalling transceiver to the existing CB antenna and also to the existing CB transceiver;
  said means for connecting comprising a switch means having a plurality of sets of contacts, each set of contacts being in a steady state position when the signalling transceiver is in said receive mode and a momentary position when the signalling transceiver is in said momentary transmit mode;
  said signalling transceiver comprising means for receiving and detecting an alerting signal including;
  an RF protection circuit to prevent reception by the signalling transceiver during transmission and reception by the CB transceiver, and also to prevent reception of all strong RF signals from any source;
  a receiver means for receiving and amplifying an alerting signal;
  and circuit means for validating the received alerting signal;
  the valid reception of an alerting signal being displayed by an illumination device and having an accompanying audio tone;
  said signalling transceiver further comprising means for transmitting an alerting signal including;
  means to produce a carrier signal;
  means to produce an audio tone;
  means to modulate the carrier signal with the audio tone;
  means to amplify and transmit the modulated carrier signal upon activation of the switch means to the momentary position;
  range control means to control the distance of transmission of the alerting signal;
  and means for supplying the audio tone to the circuit means for validating upon activation of the switch means to provide a visual display and accompanying audio tone for the operator of the signalling transceiver to know that an alerting signal has been transmitted.

2. A signalling transceiver as set forth in claim 1 comprising means to reset said illumination device.

3. A signalling transceiver as set forth in claim 1 comprising means to display serially, a single radiant per valid signal on said illumination device.

4. A signalling transceiver as set forth in claim 1 whereby said alerting signal is a narrow band, crystal controlled fixed frequency.

* * * * *